US010187898B2

(12) United States Patent
Lee et al.

(10) Patent No.: US 10,187,898 B2
(45) Date of Patent: Jan. 22, 2019

(54) METHOD AND DEVICE FOR TRANSMITTING/RECEIVING FEEDBACK SIGNAL IN MULTI-CELL COOPERATIVE COMMUNICATION SYSTEM

(71) Applicants: Samsung Electronics Co., Ltd, Gyeonggi-do (KR); Korea University Research and Business Foundation, Seoul (KR)

(72) Inventors: Inkyu Lee, Seoul (KR); Hoon Lee, Seoul (KR); Hae-Wook Park, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 166 days.

(21) Appl. No.: 14/675,492

(22) Filed: Mar. 31, 2015

(65) Prior Publication Data
US 2015/0282197 A1  Oct. 1, 2015

(30) Foreign Application Priority Data
Mar. 31, 2014  (KR) .................. 10-2014-0037392

(51) Int. Cl.
*H04L 5/00* (2006.01)
*H04W 72/08* (2009.01)
*H04W 72/04* (2009.01)

(52) U.S. Cl.
CPC ......... *H04W 72/085* (2013.01); *H04L 5/0035* (2013.01); *H04L 5/0057* (2013.01);
(Continued)

(58) Field of Classification Search
CPC ... H04L 5/0069; H04L 5/0032; H04L 5/0048; H04L 5/0073; H04L 5/0053;
(Continued)

(56) References Cited

U.S. PATENT DOCUMENTS

| 7,944,879 | B2 * | 5/2011 | Choi ...................... H04B 7/155 370/329 |
| 8,457,008 | B2 * | 6/2013 | Lim ....................... H04B 7/024 370/252 |

(Continued)

FOREIGN PATENT DOCUMENTS

KR  20140071758 A  6/2014

OTHER PUBLICATIONS

Bhagavatula, et al.; "Adaptive Limited Feedback for Sum-Rate Maximizing Beamforming Cooperative Multicell Systems"; IEEE Trans. on Signal Proc. vol. 59/No. 2; Feb. 2011; 12 pgs.

(Continued)

*Primary Examiner* — Sai Aung

(57) ABSTRACT

A UE is able to transmit a feedback signal to at least one of multiple BSs in a multi-cell cooperative communication system including the multiple BSs. The UE performs a method that includes: allocating a feedback resource for transmission of the feedback signal to the at least one BS in view of distances between the multiple BSs and the UE; creating feedback resource allocation information representing the result of the feedback resource allocation; and transmitting the created feedback allocation information to the multiple BSs.

20 Claims, 14 Drawing Sheets

(52) U.S. Cl.
CPC .......... *H04L 5/0094* (2013.01); *H04L 5/0023* (2013.01); *H04L 5/0069* (2013.01); *H04W 72/0413* (2013.01)

(58) Field of Classification Search
CPC .............. H04L 5/0035; H04W 72/082; H04W 84/047; H04W 16/26; H04W 24/10; H04W 36/0083; H04W 36/385; H04W 48/12; H04W 52/245; H04W 72/02; H04W 72/0413; H04W 72/042; H04W 88/08
See application file for complete search history.

(56) References Cited

U.S. PATENT DOCUMENTS

| | | | | |
|---|---|---|---|---|
| 9,203,575 | B2* | 12/2015 | Jia | H04W 28/06 |
| 2009/0003279 | A1* | 1/2009 | Abusch-Magder | H04W 36/0083 370/331 |
| 2009/0010215 | A1* | 1/2009 | Kim, II | H04B 7/15592 370/329 |
| 2011/0287795 | A1* | 11/2011 | Cahill | H04L 5/0005 455/509 |
| 2012/0076038 | A1* | 3/2012 | Shan | H04B 7/026 370/252 |
| 2012/0213148 | A1* | 8/2012 | Saito | H04B 7/15542 370/315 |
| 2012/0281567 | A1* | 11/2012 | Gao | H04B 7/0626 370/252 |
| 2014/0155113 | A1 | 6/2014 | Lee et al. | |
| 2014/0293899 | A1* | 10/2014 | Ko | H04L 5/0069 370/329 |

OTHER PUBLICATIONS

Lee, et al.; "Adaptive Feedback Scheme on K-Cell MISO Interfering Broadcast Channel with Limited Feedback"; IEEE Trans. on Wireless Comm, vol. 10/No. 2; Feb. 2011; 4 pgs.

Park, et al.; "Feedback Bit Allocation Schemes for Multi-User Distributed Antenna Systems"; IEEE Comm. Letters vol. 17/No. 1; Jan. 2013; 4 pgs.

* cited by examiner

METHOD AND DEVICE FOR TRANSMITTING/RECEIVING FEEDBACK SIGNAL IN MULTI-CELL COOPERATIVE COMMUNICATION SYSTEM

CROSS-REFERENCE TO RELATED APPLICATION AND CLAIM OF PRIORITY

The present application is related to and claims the benefit under 35 U.S.C. § 119(a) to Korean Application Serial No. 10-2014-0037392, which was filed in the Korean Intellectual Property Office on Mar. 31, 2014, the entire content of which is hereby incorporated by reference.

TECHNICAL FIELD

The present disclosure relates to a method and device for transmitting a feedback signal by user equipment in a multi-cell cooperative communication system.

BACKGROUND

Recently, with the common use of terminals, such as smart phones and tablet Personal Computers (PCs), and increasing demands for multimedia services, high-speed data transmission/reception is required to service high-capacity traffic. Accordingly, studies on multi-cell cooperative communication systems are increasingly conducted as one of the methods for providing high-capacity and high-speed communication for one piece of user equipment (UE). In the multi-cell cooperative communication systems, multiple Base stations (BSs) share data with one UE, unlike in the typical cellular communication systems in which a UE transmits/receives data only through one BS. That is, in the multi-cell cooperative communication systems (hereinafter, referred to as "cooperative communication systems"), one UE simultaneously transmits/receives data to/from multiple BSs. Since the multiple BSs simultaneously provide data services to one UE, the cooperative communication systems can provide higher-speed data transmission/reception than the typical systems. Therefore, the cooperative communication systems are suitable for servicing high-capacity multimedia. Such multi-cell cooperative communication systems are representative communication environments considered as next-generation communication systems, such as beyond-4G and 5G systems.

SUMMARY

To address the above-discussed deficiencies, it is a primary object to provide a method and device for selecting at least one BS for communicating by a UE in a multi-cell cooperative communication system.

Another aspect of the present disclosure is a method and device for minimizing computation in selecting at least one BS for communicating by a UE in a multi-cell cooperative communication system.

Another aspect of the present disclosure is a method and device for allocating a feedback resource to at least one BS by a UE in a multi-cell cooperative communication system.

Another aspect of the present disclosure is a method and device for transmitting feedback resource allocation information to BSs by a UE in a multi-cell cooperative communication system.

In accordance with an aspect of the present disclosure, a method of transmitting a feedback signal to at least one of multiple BSs by a UE in a multi-cell cooperative communication system including the multiple BSs is provided. The method includes: allocating a feedback resource for transmission of the feedback signal to the at least one BS in view of distances between the multiple BSs and the UE; creating feedback resource allocation information representing the result of the feedback resource allocation; and transmitting the created feedback allocation information to the multiple BSs.

The allocating of the feedback resource includes selecting at least one BS for communicating with the UE from the multiple BSs and allocating the feedback resource to the at least one selected BS.

The allocating of the feedback resource to at least one selected BS includes allocating more feedback resources to a BS closer to the UE among the at least one selected BS.

The allocating of the feedback resource includes determining a solution for minimizing the upper limit of a rate gap, wherein the rate gap means a difference between a data transmission rate in an unlimited feedback signal UE system and a data transmission rate in a limited feedback signal UE system.

The determining of the solution for minimizing the upper limit of the rate gap includes separating the upper limit into a BS pairing problem for BS selection and a problem of the feedback resource allocation, determining a solution of the separated BS pairing problem to minimize the upper limit, and substituting the determined solution of the pairing problem into the upper limit and determining a solution of the feedback resource to minimize the upper limit.

The separating includes assuming that the solution of the BS pairing problem is determined.

The determining of the solution of the separated BS pairing problem includes arranging the multiple BSs in order of distances between the multiple BSs and the UE, determining all subsets including BSs located the shortest distance from the UE among the multiple BSs arranged in order of the distances, and determining a subset minimizing the separated BS pairing problem among the subsets.

The creating of the feedback resource allocation information includes creating a feedback resource allocation matrix representing the feedback resource allocated to the at least one BS.

The transmitting of the feedback resource allocation information includes creating a matrix index corresponding to the feedback resource allocation matrix or performing run-length coding on a value of the feedback resource allocation matrix to transmit the same.

The method further includes transmitting a feedback signal to at least one BS depending upon the feedback allocation information.

In accordance with another aspect of the present disclosure, a method for receiving a feedback signal from a UE by a BS in a multi-cell cooperative communication system that includes multiple BSs is provided. The method includes: receiving an uplink signal from the UE; transmitting a received signal strength indicator of the uplink signal to the UE; receiving feedback resource allocation information created using the received signal strength indicator; and receiving a feedback signal from the UE depending upon the received feedback resource allocation information, wherein the feedback resource allocation information instructs at least one of the multiple BSs to allocate a feedback resource for transmission of the feedback signal in view of distances between the multiple BSs and the UE.

The feedback resource allocation information can be a matrix index corresponding to a feedback resource allocation matrix representing the feedback resource allocated to the at least one BS or is obtained by performing run-length coding on a value of a feedback resource allocation matrix representing the feedback resource allocated to the at least one BS.

In accordance with another aspect of the present disclosure, a UE device for transmitting a feedback signal to at least one of multiple BSs in a multi-cell cooperative communication system that includes the multiple BSs is provided. The UE device includes: a controller that allocates a feedback resource for transmission of the feedback signal to the at least one BS in view of distances between the multiple BSs and the UE and creates feedback resource allocation information representing the result of the feedback resource allocation; and a transmission/reception unit that transmits the created feedback allocation information to the multiple BSs.

In accordance with another aspect of the present disclosure, a BS device for receiving a feedback signal from a UE in a multi-cell cooperative communication system including multiple BSs is provided. The BS device includes: a transmission/reception unit that receives an uplink signal from the UE, transmits a received signal strength indicator of the uplink signal to the UE, and receives feedback resource allocation information created using the received signal strength indicator; and a controller that receives a feedback signal from the UE through the transmission/reception unit depending upon the received feedback resource allocation information, wherein the feedback resource allocation information instructs at least one of the multiple BSs to allocate a feedback resource for transmission of the feedback signal in view of distances between the multiple BSs and the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
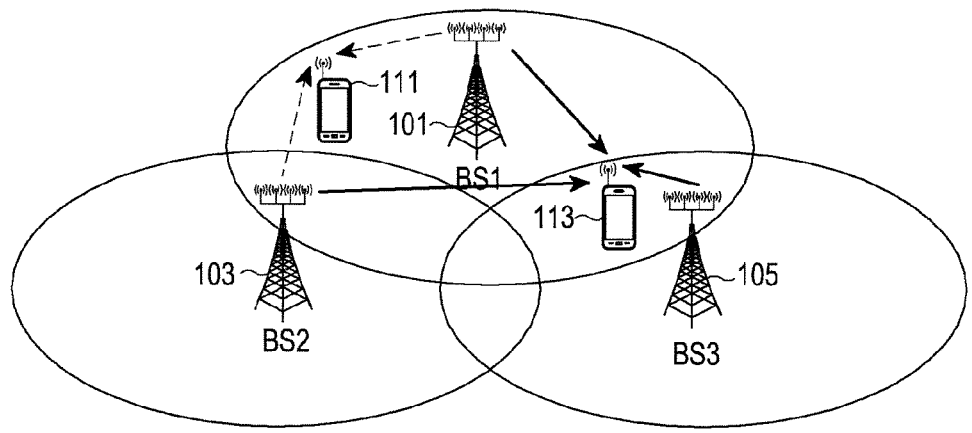
FIG. 1 is a diagram illustrating a multi-cell cooperative communication system according to an embodiment of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device or system.

The present disclosure can have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Although embodiments of the present disclosure will be separately described below for the convenience of description, two or more embodiments may be combined so long as they do not conflict with each other. The fundamental concept of the embodiments of the present disclosure will be described in brief.

According to the embodiments of the present disclosure, in a cooperative communication system in which a plurality of UEs communicate with a plurality of BSs, when each UE transmits a feedback signal to the plurality of BSs, the UE allocates resources for the feedback signal allocated thereto to at least one BS.

For reference, the feedback signal can be Channel State Information (CSI). The BS receives the feedback signal (CSI), identify a channel state between the BS and the UE from the received feedback signal, and performs beam forming of a plurality of antennas included therein using the channel state to transmit data to the UE. However, such an example is only for the convenience of description, and the feedback signal is not to be construed as being limited only to the CSI.

The resources used herein refer to resources required for communication, such as time/frequency/spatial resources for transmitting a feedback signal. However, for convenience of description, feedback "bit" is hereinafter used as the same meaning as "resource" for feedback signal transmission. In the same context, "feedback bit allocation information" has the same meaning as "feedback signal resource allocation information."

Meanwhile, in the embodiments of the present disclosure, the UE estimates distances from the plurality of BSs, selects the BSs for communicating based on the estimated distances, and allocates a feedback signal to the selected BSs.

Hereinafter, the process in which the UE selects the BSs to perform communication therewith is referred to as "base station pairing" or "pairing." Furthermore, a process in which the UE allocates feedback signal bits to the BSs paired therewith will be referred to as "feedback bit allocation."

For example, in cases where there are three BSs (BS 1, BS 2, and BS 3) and the size of a feedback signal allocated to the UE is 8 bits, the UE can select one, two, or three BSs based on distances from the BSs (base station pairing process).

If the UE is paired with two BSs (BS 1 and BS 3), the UE properly allocates the feedback signal of 8 bits to the two paired BSs. Even in this case, the UE allocates more feedback bits to the BS located a short distance away therefrom and fewer feedback bits to the BS located a long distance away therefrom. In one example, when BS 1 is located closer to the UE than BS 3, the UE can allocate 6 bits to BS 1 and 2 bits to BS 3 located a long distance away therefrom.

After performing the base station pairing and the feedback bit allocation as described above, the UE has to inform all the BSs of the results of the base station pairing and the feedback bit allocation. To this end, in the embodiments of the present disclosure, the UE creates a feedback bit allocation matrix capable of representing the pairing result and the feedback bit allocation result and transmits information on the matrix values to all the BSs. In the example, since the UE allocates 6 bits to BS 1, 0 bit to BS 2, and 2 bits to BS 3, the UE creates a feedback bit allocation matrix capable of representing such a result.

Thereafter, in order to reduce the overhead of the UE when the created matrix values are transmitted to all the BSs, the embodiments of the present disclosure minimizes the overhead of the UE in a manner of performing run-length coding on the matrix values to transmit the same or transmitting a matrix index value.

Hereinafter, the embodiments of the present disclosure will be described in detail on the basis of the fundamental concept described above.

FIG. 1 is a diagram illustrating a multi-cell cooperative communication system according to an embodiment of the present disclosure.

In FIG. 1, only three BSs 101, 103, and 105 and two UEs 111 and 113 are illustrated. However, it is apparent that this is only for the convenience of description and a larger number of BSs and UEs may exist in an actual system.

In FIG. 1, UE 1 (111) is connected to BS 1 (101) and BS 2 (103) to transmit/receive data, and UE 2 (113) is connected to BS 1 (101), BS 2 (103), and BS 3 (105) to transmit/receive data. When one UE is connected to a plurality of BSs to transmit/receive data, the UE receives a higher-speed data service than when connected to one BS.

In the cooperative communication system, if each BS has a plurality of antennas, one BS can provide a communication service to the plurality of UEs using the same frequency band for the same time through beam forming in the plurality of antennas. In this case, if the BSs to provide a service to one UE are appropriately determined, the entire system performance can be maximized.

Meanwhile, each BS receives a feedback signal from the UEs to identify information on the channel state between the BS and the UEs and performs beam forming for the plurality of antennas using the Channel State Information (C SI). However, since the feedback signal that the UEs transmit to the BS acts as considerable overhead to the UEs, the resource size for the feedback signal is generally restricted to a predetermined range. For example, a feedback signal allocated to an arbitrary UE is restricted to 10 bits. However, it is apparent that the resource size of the feedback signal is adaptively changed even in this case. The environment in which the resource size of the feedback signal is restricted in this way will be hereinafter referred to as "limited feedback signal environment."

As described above, in order to communicate with the plurality of BSs in the cooperative communication system, the UE having the limited feedback signal has to select BSs that will communicate with the UE among the plurality of BSs, and distributes and allocates the entire feedback signal to the selected BSs.

For example, UE 1 (111) selects the two BSs 101 and 103 among the three base stations (base station pairing). If UE 1 (111) has been allocated a feedback signal of 8 bits, UE 1 (111) allocates 6 out of the 8 feedback bits to BS 1 (101) and 2 bits to BS 2 (103) (feedback bit allocation).

In another example, UE 2 (113) selects all of the three BSs 101, 103, 105 (base station pairing). If UE 2 (113) has been allocated a feedback signal of 9 bits, UE 2 (113) allocates 3 out of the 9 feedback bits to BS 1 (101), 2 bits to BS 2 (103), and 4 bits to BS 3 (105) (feedback bit allocation).

Meanwhile, the three BSs 101, 103, and 105 have to identify whether to communicate with UE 1 (111) or UE 2 (113), and if performing the communication, the BSs have to identify the size of the feedback bit allocated thereto. To this end, UE 1 (111) and UE 2 (113) have to inform all the BSs 101, 103, 105 of the pairing result and the feedback bit allocation result that were performed thereby.

As described above, the embodiment of the present disclosure proposes a method in which, in the cooperative communication system having a limited feedback signal, a UE select BSs (base station pairing), allocates the feedback signal to each BS (feedback bit allocation), and informs the BSs of the allocated size of the feedback signal (feedback bit allocation information transmission).

Figure 2:
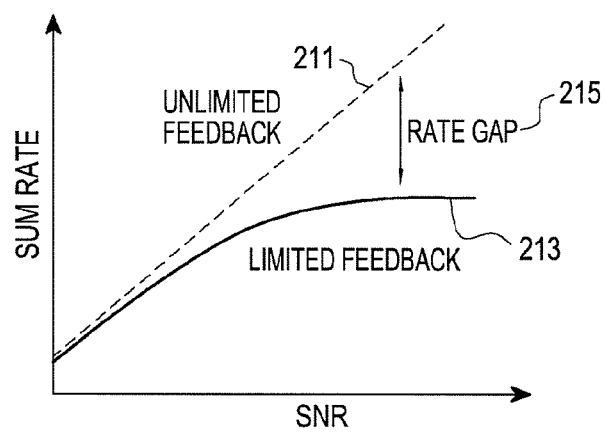
FIG. 2 is a graph illustrating the concept of a rate gap in a "limited feedback signal" situation.

FIG. 2 is a graph illustrating the concept of a rate gap in a "limited feedback signal" situation.

In FIG. 2, the horizontal axis represents an SNR, and the vertical axis represents a data transmission rate of the entire system. Furthermore, as in FIG. 1, it is assumed that a multi-cell cooperative communication system of FIG. 2 include three BSs and two UEs.

Reference numeral 211 represents a data transmission rate of the entire system in an unlimited feedback signal environment. That is, the data transmission rate is a data transmission rate of the entire system when the size of a feedback signal of a UE is not limited. In this case, since the size of the feedback signal of the UE is not limited, a BS can identify accurate channel state information. Accordingly, the entire data transmission rate linearly increases with an increasing SNR.

In contrast, reference numeral 213 represents a data transmission rate of the entire system in a limited feedback signal environment. That is, the data transmission rate is a data transmission rate of the entire system when the size of the feedback signal of the UE is limited. In this case, since the size of the feedback signal of the UE is limited, the BS may not identify accurate channel state information. Accordingly, it can be seen that, even though an SNR increases, the entire data transmission rate does not linearly increase and is limited to a predetermined value.

In this case, a difference between the data transmission rate 211 of the entire system in the unlimited feedback signal environment and the data transmission rate 213 of the entire system in the limited feedback signal environment is defined as "rate gap 215." Meanwhile, the entire system performance in the limited feedback signal environment can be increased by minimizing the rate gap.

Hereinafter, a method of minimizing the rate gap will be described. This can lead to a method for performing base station pairing and feedback bit allocation according to an embodiment of the present disclosure.

The following description will be given under an assumption that there are K UEs including a limited feedback signal and one antenna and N BSs including M antennas, and the BSs receive a feedback signal including channel information from the UEs. Meanwhile, each of the BSs is assumed to perform beam forming through a zero forcing scheme.

First, a signal $y_k$ that UE k receives from the N BSs is expressed by Equation 1 below.

Equation 1 = Reception signal:

$$y_k = \sum_{n \in D_k} \sqrt{P_{n,k}} \, d_{n,k}^{-\alpha/2} h_{n,k}^H \hat{w}_{n,k} s_k + \sum_{j \neq k} \sum_{n \in D_j} \sqrt{p_{n,j}} \, d_{n,k}^{-\alpha/2} h_{n,k}^H \hat{w}_{n,j} s_j + n_k \quad (1)$$

where:
$D_k$: set of BSs providing a service to UE k;
$P_{n,k}$: transmission power of BS n between BS n and UE k;
$d_{n,k}$: distance between BS n and UE k;
$h_{n,k}$: channel vector between BS n and UE k;
$\hat{w}_{n,k}$: beam forming vector between BS n and UE k;
$S_k$: data symbol of UE k;
$n_k$: Gaussian noise when UE k has an average of 0 and a variance of 1; and
α: path loss exponent An expected rate gap ($\Delta R_k$) in UE k is represented by Equation 2 below.

Equation 2 = $\Delta R_k$ (expected rate gap):

$$\Delta R_k = E\log_2\left(1 + \frac{\left|\sum_{n \in D_k} \sqrt{P_{n,k}} \, d_{n,k}^{-\alpha/2} h_{n,k}^H w_{n,k}\right|^2}{1 + \sum_l \left|\sum_{n \in D_k^c \cap D_l} \sqrt{P_{n,l}} \, d_{n,k}^{-\alpha/2} h_{n,k}^H w_{n,l}\right|^2}\right) - \quad (2)$$

$$E\log_2\left(1 + \frac{\left|\sum_{n \in D_k} \sqrt{P_{n,k}} \, d_{n,k}^{-\alpha/2} h_{n,k}^H \hat{w}_{n,k}\right|^2}{1 + \sum_{j \neq k} \left|\sum_{n \in D_j} \sqrt{P_{n,j}} \, d_{n,k}^{-\alpha/2} h_{n,k}^H \hat{w}_{n,j}\right|^2}\right)$$

Where, $W_{n,k}$ denotes a beam forming vector calculated by a base station using accurate channel information in a unlimited feedback signal environment.

As seen in Equation 2, a solution for minimizing $\Delta R_k$ requires very complex calculations. Accordingly, in the embodiment of the present disclosure, the complexity of the calculations is reduced by obtaining an upper limit of $\Delta R_k$ and optimizing the upper limit.

As seen in Equation 2, a solution for minimizing $\Delta R_k$ requires very complex calculations. Accordingly, in the embodiment of the present disclosure, the complexity of the calculations is reduced by obtaining an upper limit of $\Delta R_k$ and optimizing the upper limit.

Through several steps of manipulation for Equation 2, the upper limit of $\Delta R_k$ is obtained by Equation 3 below.

Equation 3 = Upper limit of $\Delta R_k$:

$$\Delta R_k < \log_2\left(1 + \sum_{j \neq k} E\left|\sum_{n \in D_j} \sqrt{P_{n,j}} d_{n,k}^{-\alpha/2} h_{n,k}^H \hat{w}_{n,j}\right|^2\right) \leq \quad (3)$$

$$\log_2\left(1 + 2\sum_{j \neq k} E\left|\sum_{n \in D_k \cap D_j} \sqrt{P_{n,j}} d_{n,k}^{-\alpha/2} h_{n,k}^H \hat{w}_{n,j}\right|^2 + \right.$$

$$\left. 2\sum_{l} E\left|\sum_{m \in D_k^c \cap D_l} \sqrt{P_{m,l}} d_{m,k}^{-\alpha/2} h_{m,k}^H \hat{w}_{m,l}\right|^2\right).$$

Using the Cauchy-Schwarz inequality in Equation 3, the upper limit of $\Delta R_k$ is finally expressed as Equation 4 below.

Equation 4 = Final upper limit of $\Delta R_k$:

$$\Delta R_k \leq \log_2\left(1 + 2\sum_{j \neq k}|D_k \cap D_j|\sum_{n \in D_k \cap D_j} P_{n,j} d_{n,k}^{-\alpha} E|h_{n,k}^H \hat{w}_{n,j}|^2 + \right. \quad (4)$$

$$\left. 2\sum_{l}|D_k^c \cap D_l|\sum_{m \in D_k^c \cap D_l} P_{m,l} d_{m,k}^{-\alpha} E|h_{m,k}^H \hat{w}_{m,l}|^2\right)$$

By applying the following Equation 5 to Equation 4, Equation 4 is expressed as Equation 6 below.

Equation 5

$$E|h_{n,k}^H \hat{w}_{n,j}|^2 \quad (5)$$

$$\begin{cases} < \frac{M}{M-1} 2^{-\frac{B_{n,k}}{M-1}}, & \text{if } n \in D_k \quad |D_k \cap D_j| \leq |D_k| \\ = 1, & \text{if } n \in D_k^c \quad |D_k^c \cap D_j| \leq |D_k^c| = N - |D_k| \end{cases}$$

Equation 6

$$\Delta R_k < \log_2\left(1 + 2\frac{M}{M-1}|D_k|\sum_{n \in D_k}\left(\sum_{j \in U_n \setminus \{k\}} P_{n,j}\right) d_{n,k}^{-\alpha} 2^{-\frac{B_{n,k}}{M-1}} + \right. \quad (6)$$

$$\left. 2(N-|D_k|)\sum_{m \in D_k^c}\left(\sum_{l \in U_m} P_{m,l}\right) d_{m,k}^{-\alpha}\right) <$$

$$\log_2\left(1 + 2P\left(\frac{M}{M-1}|D_k|\sum_{n \in D_k} d_{n,k}^{-\alpha} 2^{-\frac{B_{n,k}}{M-1}} + (N-|D_k|)\sum_{m \in D_k^c} d_{m,k}^{-\alpha}\right)\right)$$

The second inequality in Equation 6 is calculated from a base station power limit $$\sum_{j \in U_n \setminus \{k\}} P_{n,j} \leq P - P_{n,k} < P$$

and $$\sum_{j \in U_n} P_{n,j} \leq P.$$

By performing calculation according to that, Equation 6 above is expressed as Equation 7 below.

Equation 7

$$\Delta R_k < \quad (7)$$

$$\log_2\left(1 + 2P\left(\frac{M}{M-1}|D_k|\sum_{n \in D_k} d_{n,k}^{-\alpha} 2^{-\frac{B_{n,k}}{M-1}} + (N-|D_k|)\sum_{m \in D_k^c} d_{m,k}^{-\alpha}\right)\right) =$$

$$U_k(B_{n,k}, D_k)$$

P: transmission power per base station
$B_{n,k}$: the number of feedback bits for quantizing a channel between UE k and BS n Meanwhile, in a system having a limited feedback signal, the maximum number of feedback bits that each UE can allocate is limited to a predetermined size. Therefore, a problem of minimizing the upper limit of $\Delta R_k$ in Equation 7 above is expressed by Equation 8.

Equation 8

$$(B_{n,k}^*, D_k^*) = \arg\min_{(B_{n,k}, D_k)} U_k(B_{n,k}, D_k) \quad (8)$$

$$\text{subject to } \sum_{n \in D_k} B_{n,k} = B^t$$

$$D_k \subset \{1, 2, \ldots, N\}.$$

where $B^t$ denotes the total number of bits of a limited feedback signal of a UE.

Hereinafter, a feedback signal allocation method proposed in the embodiment of the present disclosure will be described.

In order to obtain the solution ($D_k^*$) of base station pairing and the solution ($B_{n,k}^*$) of feedback bit allocation, Equation 8 has to calculate a solution into which both the solutions are combined. Therefore, the calculations are still complicated.

Accordingly, assuming that the BS pairing BS set ($D_k$) in Equation 8 has been arbitrarily determined, the solution ($B_{n,k}^*$) of the feedback bit allocation is obtained.

Considering $$\frac{PM}{M-1}|D_k|\sum_{n \in D_k} d_{n,k}^{-\alpha} 2^{-\frac{B_{n,k}}{M-1}},$$

the second term of the log function in Equation 4, the corresponding value can be minimized by determining $B_{n,k}$ as a proper value when $D_k$ is constant. Since the log function is an increasing function and P, M, and $|D_k|$ are constant, the feedback bit allocation problem is expressed from Equation 8 to Equation 9 below.

Equation 9

$$B_{n,k}^* = \arg\min_{B_{n,k}} \sum_{n \in D_k} d_{n,k}^{-\alpha} 2^{-\frac{B_{n,k}}{M-1}} \quad (9)$$

$$\text{subject to } \sum_{n \in D_k} B_{n,k} = B^t$$

If the Karush-Kuhn-Tucker (KKK) condition is used to obtain the solution of Equation 9, the solution of $B_{n,k}^*$ can be obtained through a water-filling algorithm such as Equation 10 below. For reference, since the KKT condition is a necessary and sufficient condition satisfying the optimum solution for a convex problem, the optimum solution of Equation 9 can be obtained by finding out a root satisfying the KKT condition of Equation 9 which is a convex problem. Furthermore, the water-filling algorithm has been well-known as a method for calculating the solution such as Equation 10 below.

Equation 10 → Final solution of feedback bit allocation $$B_{n,k}^* = \left(\frac{B^t}{|D_k|} + (M-1)\log_2 \frac{d_{n,k}^{-\alpha}}{\left(\prod_{m \in D_k} d_{m,k}^{-\alpha}\right)^{1/|D_k|}}\right)^+ \quad (10)$$

where $(x)+ = \max(x, 0)$.

According to the result of Equation 10 above, in the feedback bit allocation method according to the embodiment of the present disclosure, more feedback bits are allocated to a BS located a short distance away from the corresponding UE, and fewer feedback bits are allocated to a BS located a long distance away from the corresponding UE. The entire system performance can be enhanced by allocating the feedback bits in such a manner.

An example of the feedback bit allocation will be described with reference to FIG. 3.

Figure 3:
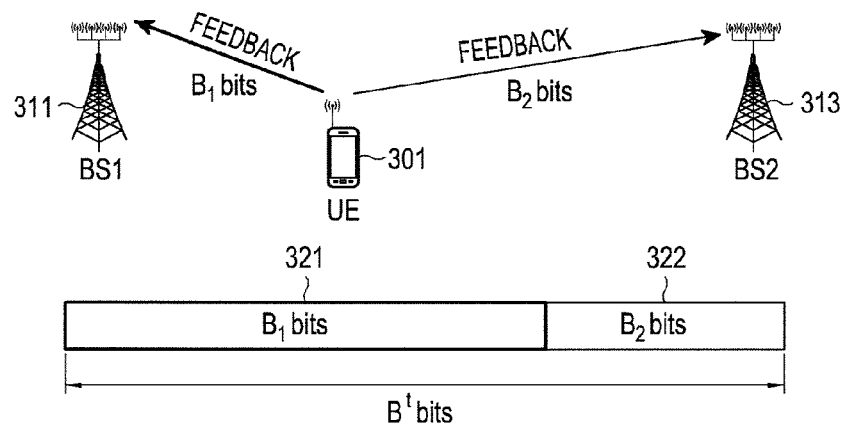
FIG. 3 is a diagram illustrating a feedback bit allocation method according to an embodiment of the present disclosure.

FIG. 3 is a diagram illustrating a feedback bit allocation method according to an embodiment of the present disclosure.

Referring to FIG. 3, a UE 301 allocates feedback bits to BSs according to Equation 10. In FIG. 3, the UE 301 allocates B1 out of the total Bt bits of an available feedback signal to BS 1 (311) as indicated by reference numeral 321 and allocates B2 bits to BS 2 (313) as indicated by reference numeral 322. Here, the value of B1 is larger than that of B2. As illustrated in FIG. 3, the distance between the UE 301 and BS 1 (311) is shorter than that between the UE 301 and BS 2 (313). Therefore, it can be seen that the UE 301 allocates more feedback bits to BS 1 (311) than to BS 2 (313).

Hereinafter, a method of pairing a BS and a UE will be described.

Substitution of the solution of the feedback bit allocation obtained by using Equation 10 into $U_k(B_{n,k}, D_k)$ of Equation 8, which is the upper limit of $\Delta R_k$, results in Equation 11.

Equation 11

$$U_k(B_{n,k}^*, D_k) = \log_2\left(1 + 2P\left(\frac{M}{M-1}|D_k|^2 2^{-\frac{B^t}{|D_k|(M-1)}}\left(\prod_{n \in D_k} d_{n,k}^{-\alpha}\right)^{1/|D_k|} + (N-|D_k|)\sum_{m \in D_k^c} d_{m,k}^{-\alpha}\right)\right) \quad (11)$$

$$= \log_2(1 + 2P \cdot f(D_k))$$

In Equation 11, the log function is an increasing function, and P is a constant irrespective of $D_k$. Therefore, a method of minimizing $f(D_k)$ to obtain a pairing solution is proposed. Meanwhile, it can be identified that $f(D_k)$ is independent of $B_{n,k}$. That is, using the above-described solution of the feedback bit allocation, a combination problem of $D_k$ and $B_{n,k}$ is separated into a pairing problem (Equation 12 below) and a feedback bit allocation problem with $D_k^*$ (Equation 13 below).

Equation 12

$$D_k^* = \underset{D_k}{\arg\min} f(D_k) \quad (12)$$

subject to $D_k \subset \{1, 2, \ldots, N\}$.

Equation 13

$$B_{n,k}^* = \underset{B_{n,k}}{\arg\min} \sum_{n \in D_k^*} d_{n,k}^{-\alpha} 2^{-\frac{B_{n,k}}{M-1}} \quad (13)$$

subject to $\sum_{n \in D_k^*} B_{n,k} = B^t$.

Describing once again, the pairing solution is determined first using Equation 12, and the number of feedback bits to be allocated to a BS determined according to the pairing is then calculated using Equation 10. In this way, Equation 8, with which the pairing problem and the feedback bit allocation problem are combined, can be divided into a pairing step and a feedback bit allocation step, thereby considerably decreasing the calculation complexity.

Meanwhile, in solving Equation 12 to obtain the solution of the pairing, $f(D_k)$ has to be calculated for all subsets of $\{1, 2, 3, 4, \ldots, N\}$ which is a set of all BSs. In this case, the number of subsets, namely, a search size thereof is $2^N-1$. If the number of BSs N increases, the search size increases, whereby the entire complexity exponentially increases. Accordingly, in determining the pairing, the following method is proposed to decrease the complexity.

Step (1): Align indices of BSs such that $d_{1,k}^{-\alpha} \geq d_{2,k}^{-\alpha} \geq \ldots \geq d_{N,k}^{-\alpha}$ is satisfied.

Step (2): Calculate $f(\{1\}), f(\{1, 2\}), \ldots, f(\{1, 2, \ldots, N\})$.

Step (3): Select $D_k$ that makes $f(D_k)$ smallest, among a total of N candidates.

If the method is used, the search size is reduced to N.

For reference, as mentioned in Equation 1, $D_k$ is a set of BSs providing a service to UE k, $d_{n,k}$ represents a distance between BS n and UE k, and α means a path loss exponent. Therefore, the step (1) is to align all BSs in order of how close to a UE, the step (2) is to calculate $f(D_k)$ of Equation 11 for subsets including the closest BS to the UE, and the step (3) is to select BS sets for which $f(D_k)$ is smallest.

For example, it is assumed that there are three BSs, namely, BS 1, BS 2, and BS 3 and the first closest BS to a UE is BS 3, the second closest BS is BS 1, and the farthest BS from the UE is BS 2. Under the assumption, the above-described contents will be illustrated with a specific example as follows.

(1) It is assumed that the UE has determined BSs satisfying $d_{1,k}^{-\alpha} \geq d_{2,k}^{-\alpha} \geq \ldots \geq d_{N,k}^{-\alpha}$ to be BS 3, BS 1, and BS 2.

(2) The UE sets all possible $D_k$ sets to $D_k=\{3\}$, $D_k=\{3, 1\}$, or $D_k=\{3, 1, 2\}$ such that the aligned sequence is satisfied and calculates $f(D_k)$ for the three cases.

(3) For the three cases, the UE selects a BS of $D_k$ that minimizes $f(D_k)$ and determine BSs pertaining to the corresponding $D_k$ to be pairing BSs.

Figure 4:
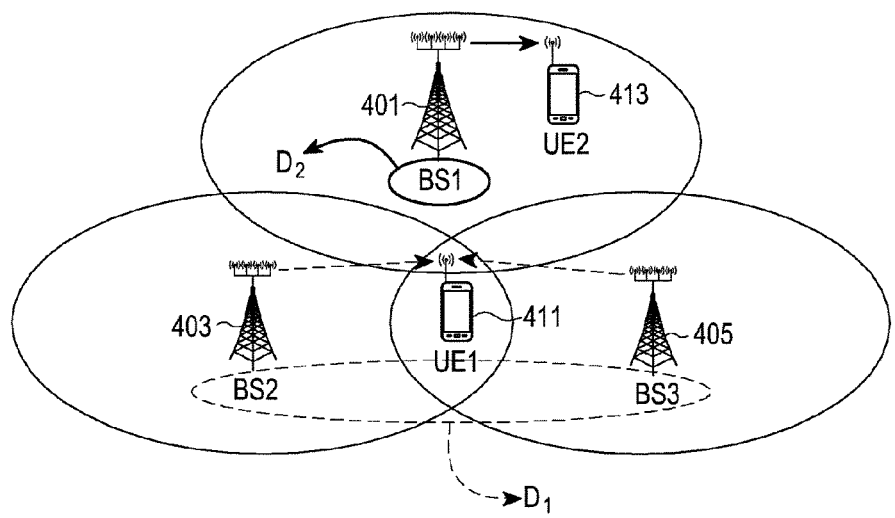
FIG. 4 is a diagram illustrating an example of a pairing method according to an embodiment of the present disclosure.

FIG. 4 is a diagram illustrating an example of a pairing method according to an embodiment of the present disclosure.

Referring to FIG. 4, it is illustrated that UE 1 (411) is paired with two BSs 403 and 405 among three BSs and UE 2 (413) is paired with only one BS 301 among the three BSs according to the above-described pairing method. That is, for UE 1 (411), $D_k$ minimizing $f(D_k)$ is $D_k=\{3, 2\}$, and for UE 2 (413), $D_k$ minimizing $f(D_k)$ is $D_k=\{3, 1\}$.

Such pairing is an example of selecting a BS by the above-described pairing method.

The BS-UE pairing method and the feedback bit allocation method have hitherto been described. Hereinafter, a method in which, after pairing and feedback bit allocation, a UE informs each BS of the feedback bit allocation will be described.

Figure 5:
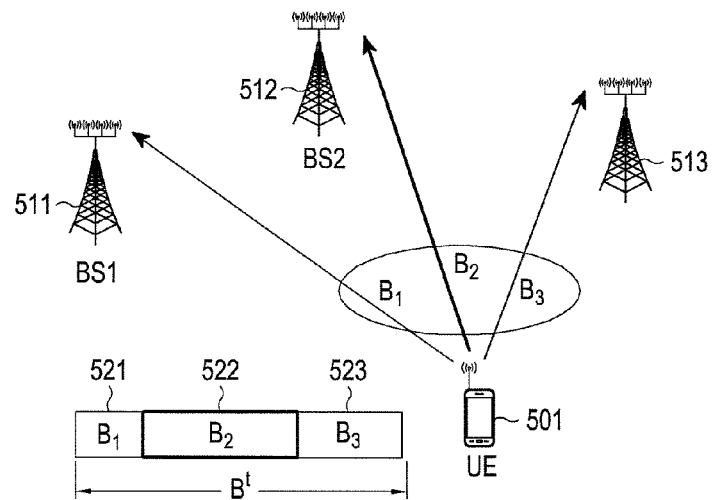
FIG. 5 is a diagram illustrating a concept by which a UE informs a BS of a feedback bit allocation result, according to an embodiment of the present disclosure.

FIG. 5 is a diagram illustrating a concept by which a UE informs a BS of a feedback bit allocation result, according to an embodiment of the present disclosure.

Referring to FIG. 5, a UE 501 transmits a feedback signal of a total of $B^t$ bits. According to the above-described method, the UE 501 allocates B1 feedback bits 521, B2 feedback bits 522, and B3 feedback bits 523 to BS 1 (511), BS 2 (512), and BS 3 (513), respectively. Thereafter, the UE 501 transmits information on the allocated feedback bits to BS 1 (511), BS 2 (512), and BS 3 (513).

However, it is considerable overhead to the UE to transmit the feedback bit allocation information to the plurality of BSs after allocating the feedback bits to each BS. Accordingly, a method of minimizing overhead when transmitting the feedback bit allocation information is proposed in an embodiment of the present disclosure.

Figure 6:
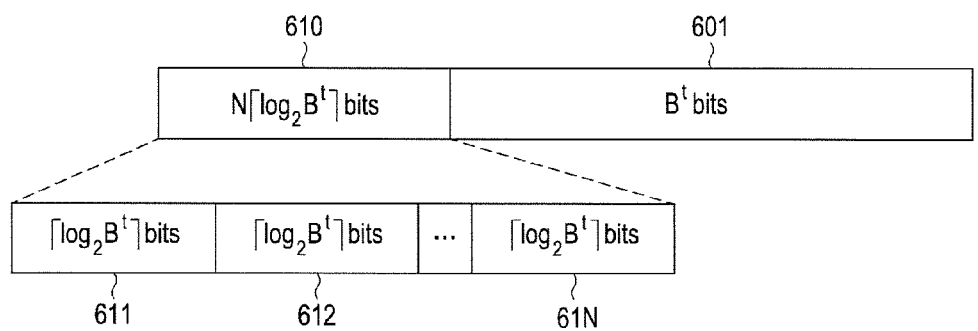
FIG. 6 is a diagram illustrating a method for transmitting feedback bit allocation information according to an embodiment of the present disclosure.

FIG. 6 is a diagram illustrating a method for transmitting feedback bit allocation information according to an embodiment of the present disclosure.

Reference numeral 601 indicates a feedback information transmission field allocated to a UE, and the feedback information transmission field is assumed to be limited to a size of $B^t$ bits. Reference numeral 610 indicates a feedback bit allocation information transmission field.

The UE transfers, to all BSs, size information of feedback bits allocated to the BSs as illustrated in FIG. 6 to transmit feedback allocation information to the BSs. For example, it is assumed that a total of N(=3) BSs exist, the size of the feedback bits 601 of the UE is set to $B^t=2^3=8$ bits, and 2 bits are allocated to BS1, 3 bits to BS 2, and 3 bits to BS 3.

In this case, in order to inform N BSs of the feedback bit allocation information, the feedback bit allocation information transmission field 610 has to include N fields (611, 612, ..., 61N). In addition, since the fields (611, 612, ..., 61N) have to be able to display that 8 bits, the maximum size of the feedback bits, are allocated, the size of the fields (611, 612, ..., 61N) is to be $\log_2 2^3 = 3$ bits. That is, since all the feedback bit allocation information has to be able to represent the size of the feedback bits allocated to all the BSs and 3 bits are required for each of the three BSs, the size of the feedback bit allocation information field 610 is a total of 9 bits. However, in such a method, if the number of BSs increases, the size of a field (i.e., a resource) required for feedback bit information transmission also linearly increases so that the entire system overhead becomes very large.

Accordingly, a method for more efficiently transmitting feedback bit allocation information, according to an embodiment of the present disclosure, is proposed.

In the proposed method of transmitting feedback allocation information, according to the embodiment of the present disclosure, a UE creates a feedback bit allocation matrix capable of representing a pairing result and a feedback bit allocation result and transmits information representing values of the matrix to a BS.

For example, a feedback bit allocation matrix A with a size of $(N-1) \times B^t$ is defined by Equation 14 below.

Equation 14

$$[A]_{i,j} = \begin{cases} 1, & \text{if a user allocates } j \text{ bits for } BS\ i \\ 0, & \text{otherwise} \end{cases} \quad (14)$$

If the BS receives and decodes the matrix A, the BS identifies the feedback bit allocation matrix of the corresponding UE and identifies a pairing result and a feedback bit allocation result from the feedback bit allocation matrix.

Figure 7:
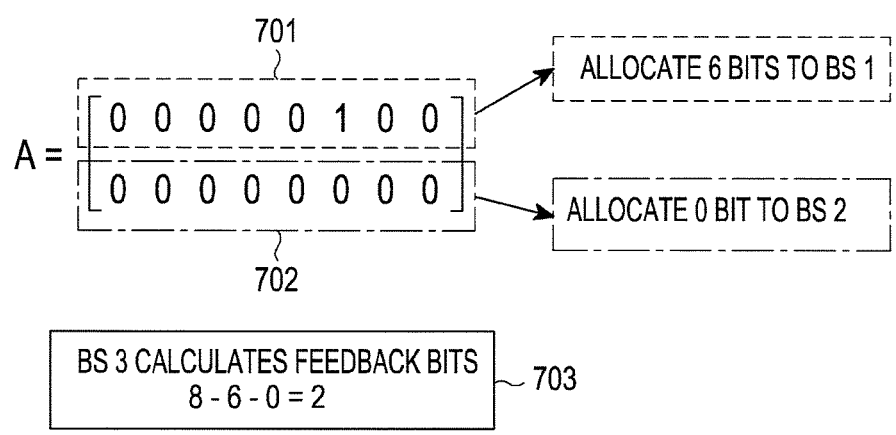
FIG. 7 illustrates an example of a feedback bit allocation matrix according to an embodiment of the present disclosure.

FIG. 7 illustrates an example of a feedback bit allocation matrix according to an embodiment of the present disclosure.

In FIG. 7, it is assumed that the number of BSs is 3 and the total size of feedback bits allocated to a UE is 8 bits (i.e., N=3, $B^t$=8). In addition, it is assumed that BS 1 is allocated 6 out of 8 bits, BS 2 does not service the corresponding UE, and BS 3 is allocated 2 out of 8 bits.

Matrix A (700) represents the base station pairing result and the feedback bit allocation result. That is, when the feedback bit allocation matrix is transmitted to N BSs, the N BSs can identify how many feedback bits are allocated to each BS.

The first row 701 represents that 6 feedback bits are allocated to BS 1. To this end, only the sixth column is set to 1. The second row 702 represents that 0 feedback bit is allocated to BS 2. To this end, all columns are set to 0.

Meanwhile, the third row does not exist, and BS 3 identifies feedback bits allocated thereto through the first row 701 and the second row 702. That is, BS 3 calculates the size of the feedback bits allocated thereto using an equation (the total number of feedback bits of the UE—the sum of the allocated bits of the other BSs=the allocated bits of BS 3). It can be seen (as indicated by reference numeral 703) that the size of the feedback bits allocated to BS 3 is 8−6=2 bits in the example of FIG. 7. Using the feedback bit allocation matrix, the pairing result and the size of the feedback bits allocated to the corresponding BS can be identified.

Meanwhile, in order to minimize overhead when transmitting the feedback bit allocation matrix of FIG. 7, a method using run-length coding and a method using a matrix index are proposed in an embodiment of the present disclosure.

First, a method of transmitting feedback bit allocation information using run-length coding will be described.

The run-length coding is an encoding method of processing the same data value as a run to compress and encode the same in cases where the same data value consecutively occurs. Since the matrix A (700) is a sparse matrix including a large number of 0 s and a small number of 1 s, the value of 0 is more likely to continue. For such a sparse matrix, the run-length coding is a means for efficiently compressing information. Therefore, when the matrix A is transmitted using the run-length coding, information for representing values of the matrix A significantly decreases.

For example, since 0 consecutively occurs five times prior to the first 1 in matrix A (700) of FIG. 7, if information "5" is compressed and then transmitted, a BS decodes the matrix A using the following decoding method.

Step (1): Write the number of 0 s for each of n bit groups.

Step (2): Strop writing at the end of the bit string.

Step (3): If it is not the end of the bit string and the n bit groups are smaller than $2^n-1$, write 1 and return to step (1), and if n bit groups are equal to $2^n-1$, return to step (1).

Here, n is the size of the bit group and is configured experimentally or by a setting to minimize overhead.

Hereinafter, a method of transmitting a feedback bit allocation matrix using a matrix index will be described.

In the method using a matrix index, an index is set for each of all possible feedback bit allocation matrices A according to the number of BSs and the total number of feedback bits of a UE, and only the index of the corresponding feedback bit allocation matrix is transmitted.

That is, when the number of BSs (N) and the number of feedback bits of a UE ($B^t$) are determined, the BSs and the UE identify all possible feedback bit allocation matrices and matrix indices corresponding to the respective matrices according to a pre-defined rule. In addition, the BSs and the UE pre-store mapping relations between the matrices and the matrix indices in a table format.

The UE performs pairing and feedback bit allocation and transmits, to each BS, the index value of the matrix A representing the feedback bit allocation for the BS. The BS receiving the index value of the matrix A identifies the pairing result and the feedback bit allocation result from the matrix A corresponding to the received index value.

The method using a matrix index needs a total of $$\left\lceil \log_2 \binom{N + B^t - 1}{B^t} \right\rceil$$

overhead bits which are approximately scaled to $\log_2 N$. The overhead is considerably reduced compared to the typical transmission method in which overhead linearly increases for BS N as described above with reference to FIG. 7.

Figure 8:
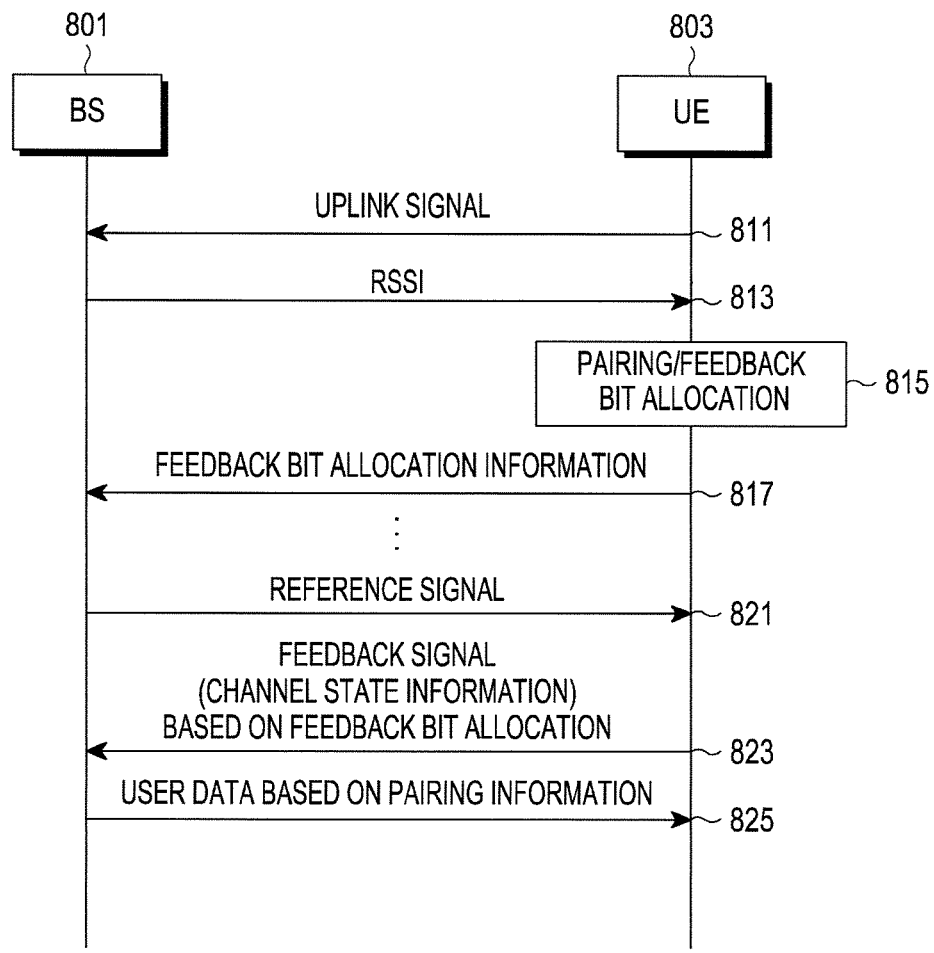
FIG. 8 is a signal flow diagram illustrating the entire signal transmission/reception between a BS and a UE according to an embodiment of the present disclosure.

FIG. 8 is a signal flow diagram illustrating the entire signal transmission/reception between a BS and a UE according to an embodiment of the present disclosure.

A UE 803 transmits an uplink signal to a BS 801 (Step 811), and the BS 801 transmits a Received Signal Strength Indicator (RSSI) for the received signal to the UE 803 (Step 813). Here, although the uplink signal is representatively an uplink reference signal, the present disclosure is not limited thereto.

The UE 803 performs pairing and/or feedback bit allocation using the received RSSI (Step 815). The pairing and the feedback bit allocation are performed based on a distance between the UE and the BS. Specifically, the UE estimates, from the received RSSI, a channel state between the corresponding BS 801 and the UE 803 and estimates, from the estimated channel state, the distance between the BS 801 and the UE. Consequently, the UE identifies, from the RSSI, the distance between the BS 801 and the UE and based on the identified distance, performs pairing and allocate feedback bits to the paired BS 801 according to the embodiment of the present disclosure described above.

Thereafter, the UE 803 transmits feedback bit allocation information to the BS (Step 817). That is, as described above with reference to FIG. 7, the UE 803 creates a feedback bit allocation matrix representing the pairing result and the feedback bit allocation result and transmits information of the matrix value using run-length coding or in the form of a matrix index.

In the above-described process, the UE 803 performs the pairing and the feedback bit allocation in view of the distance between the BS 801 and the UE and transmits, to the BS 801, the matrix value for the feedback bit allocation information using run-length coding or in the form of a matrix index.

In steps 821, 823, and 825 below, the UE 803 transmits a feedback signal to the BS 801 according to the allocated feedback bits.

That is, if the BS 801 transmits a reference signal to the UE 803 for a certain reason and the UE 803 receives the reference signal (Step 821), the UE 803 creates a feedback signal corresponding to the bit size allocated to the relevant BS 801 based on the feedback bit allocation information and transmits the feedback signal (Step 823). The BS 801 receives the feedback signal depending upon the size information of the allocated feedback bits and transmits, together with other paired BSs, user data to the UE 803 based on the pairing information which is identified from the feedback bit allocation information (Step 825).

Figure 9:
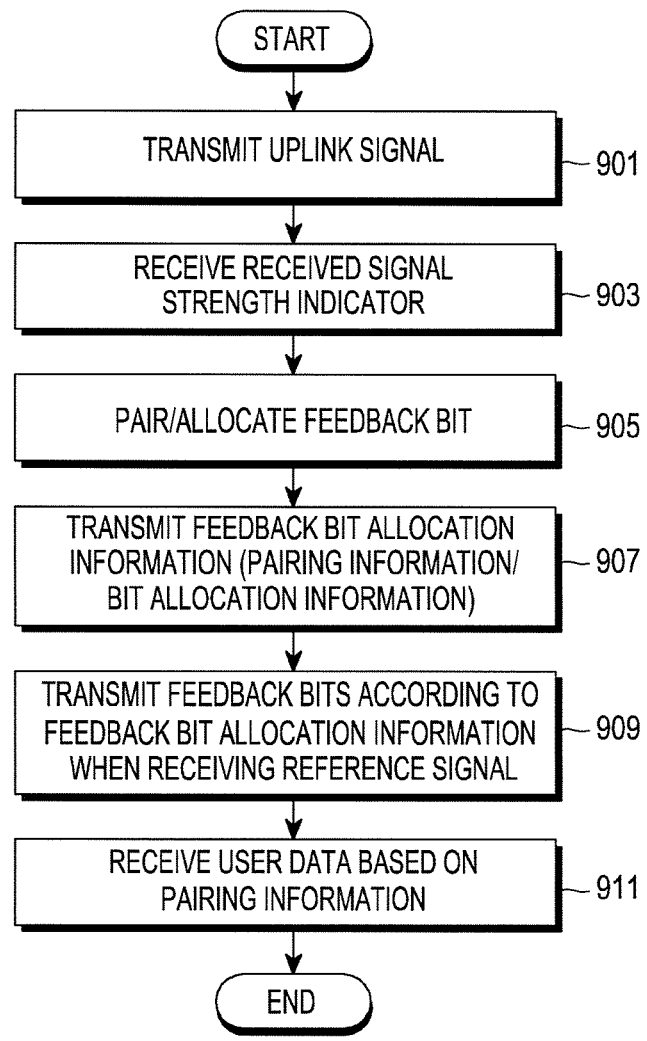
FIG. 9 is a flowchart illustrating operations of a UE according to an embodiment of the present disclosure.

FIG. 9 is a flowchart illustrating operations of a UE according to an embodiment of the present disclosure.

The UE transmits an uplink signal to a BS (Step 901) and receives a Received Signal Strength Indicator (RSSI) from the BS (Step 903). Here, although the uplink signal is representatively an uplink reference signal, the present disclosure is not limited thereto. The UE performs pairing and/or feedback bit allocation using the received RSSI (Step 905). The pairing and the feedback bit allocation are performed based on a distance between the UE and the BS. Specifically, the UE estimates, from the received RSSI, a channel state between the corresponding BS and the UE and estimate, from the estimated channel state, the distance between the BS and the UE. Consequently, the UE identifies, from the RSSI, the distance between the BS and the UE and, according to the above-described embodiment of the present disclosure, performs pairing and allocates feedback bits to paired BSs.

Thereafter, the UE transmits feedback bit allocation information to the BS (Step 907). That is, as described above with reference to FIG. 7, the UE creates a feedback bit allocation matrix representing the pairing result and the feedback bit allocation result and transmits information of the matrix value using run-length coding or in the form of a matrix index.

After the process, the UE, when receiving a reference signal from the BS, creates a feedback signal corresponding to the bit size allocated to the relevant BS based on the feedback bit allocation and transmits the created feedback signal (Step 909). Thereafter, the UE receives user data from the BS (Step 911).

Figure 10:
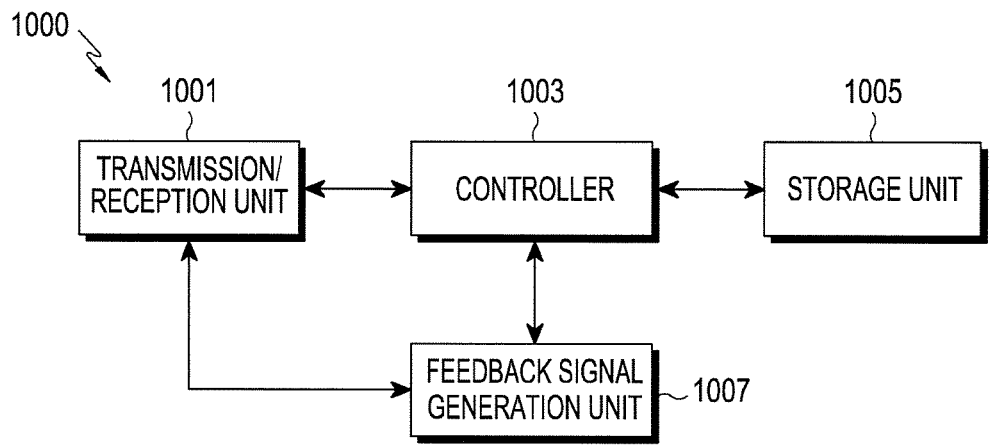
FIG. 10 is a block diagram illustrating a configuration of a UE device according to an embodiment of the present disclosure.

FIG. 10 is a block diagram illustrating a configuration of a UE device according to an embodiment of the present disclosure.

The UE device 1000 includes a transmission/reception unit 1001, a controller 1003, and a feedback signal generation unit 1007. In addition, the UE device 1000 further includes a storage unit 1005 and performs the operations illustrated in FIG. 9. The specific operations are as follows.

The transmission/reception unit 1001 transmits an uplink signal to a BS and receives a Received Signal Strength Indicator (RSSI) from the BS.

The controller 1003 performs pairing and/or feedback bit allocation using the received RSSI and transmits feedback bit allocation information through the transmission/reception unit 1001. That is, as described above with reference to FIG. 7, the controller 1003 creates a feedback bit allocation matrix representing the pairing result and the feedback bit allocation result and transmits information of the matrix value using run-length coding or in the form of a matrix index. The feedback bit allocation matrix, the matrix index, or both, are pre-stored in the storage unit 1005.

If receiving a reference signal from the BS, the feedback signal generation unit 1007 generates a feedback signal corresponding to the bit size allocated to the relevant BS based on the feedback bit allocation performed by the controller 1003 and transmits the generated feedback signal through the transmission/reception unit 1001. Thereafter, the transmission/reception unit 1001 receives user data from the BS.

Figure 11:
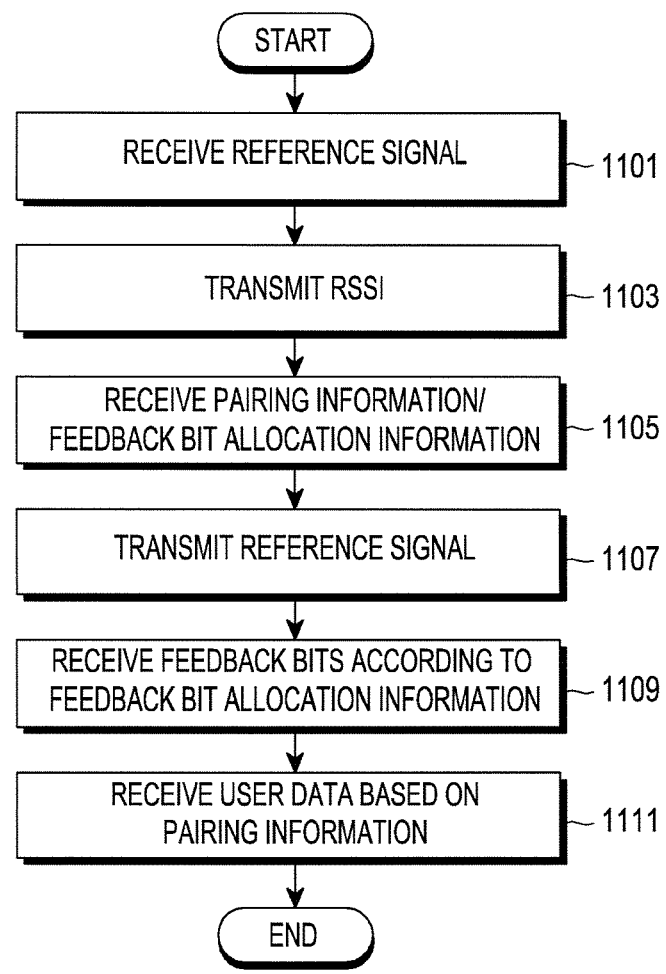
FIG. 11 is a flowchart illustrating operations of a BS according to an embodiment of the present disclosure.

FIG. 11 is a flowchart illustrating operations of a BS according to an embodiment of the present disclosure.

When the BS receives an uplink signal (e.g., a reference signal) from a UE (Step 1101), the BS transmits information (RSSI) representing received signal strength to the UE (Step 1103). Thereafter, the BS receives feedback bit allocation information from the UE (Step 1105). As described above, the feedback bit allocation information is obtained by receiving a value of a feedback bit allocation matrix using run-length coding or in the form of a matrix index.

The BS, after transmitting a reference signal to the UE (Step 1107), receives a feedback signal from the UE according to the feedback bit size that is identified from the feedback bit allocation information (Step 1109). Thereafter, together with other BSs, the BS transmits user data to the UE based on the pairing information that is identified from the feedback bit allocation information (Step 1111).

Figure 12:
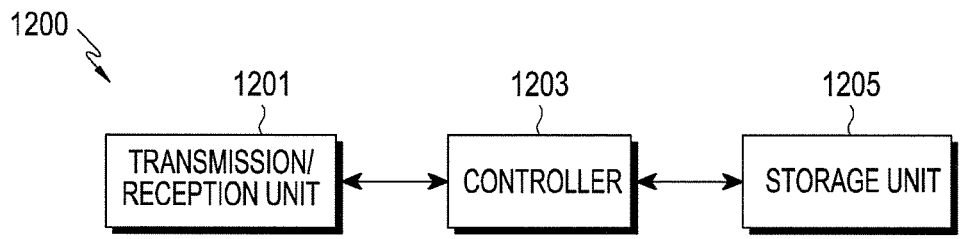
FIG. 12 is a block diagram illustrating a configuration of a BS device according to an embodiment of the present disclosure.

FIG. 12 is a block diagram illustrating a configuration of a BS device according to an embodiment of the present disclosure.

The BS device 1200 includes a transmission/reception unit 1201 and controller 1203. In addition, the BS device 1200 further includes a storage unit 1205.

The transmission/reception unit 1201 receives an uplink signal (e.g., a reference signal) from a UE and transmits information (RSSI) representing received signal strength to the UE in response to the uplink signal. In addition, the transmission/reception unit 1201 receives feedback bit allocation information from the UE. As described above, the feedback bit allocation information is obtained by receiving a value of a feedback bit allocation matrix using run-length coding or in the form of a matrix index. The feedback bit allocation matrix, the matrix index, or both, are pre-stored in the storage unit 1205.

After transmitting a reference signal to the UE, the controller 1203 receives, through the transmission/reception unit 1201, a feedback signal from the UE according to the feedback bit size that can be identified from the feedback bit allocation information. In addition, together with other BSs, the controller 1203 transmits user data to the UE through the transmission/reception unit 1201 based on the pairing information that is identified from the feedback bit allocation information.

Figure 13:
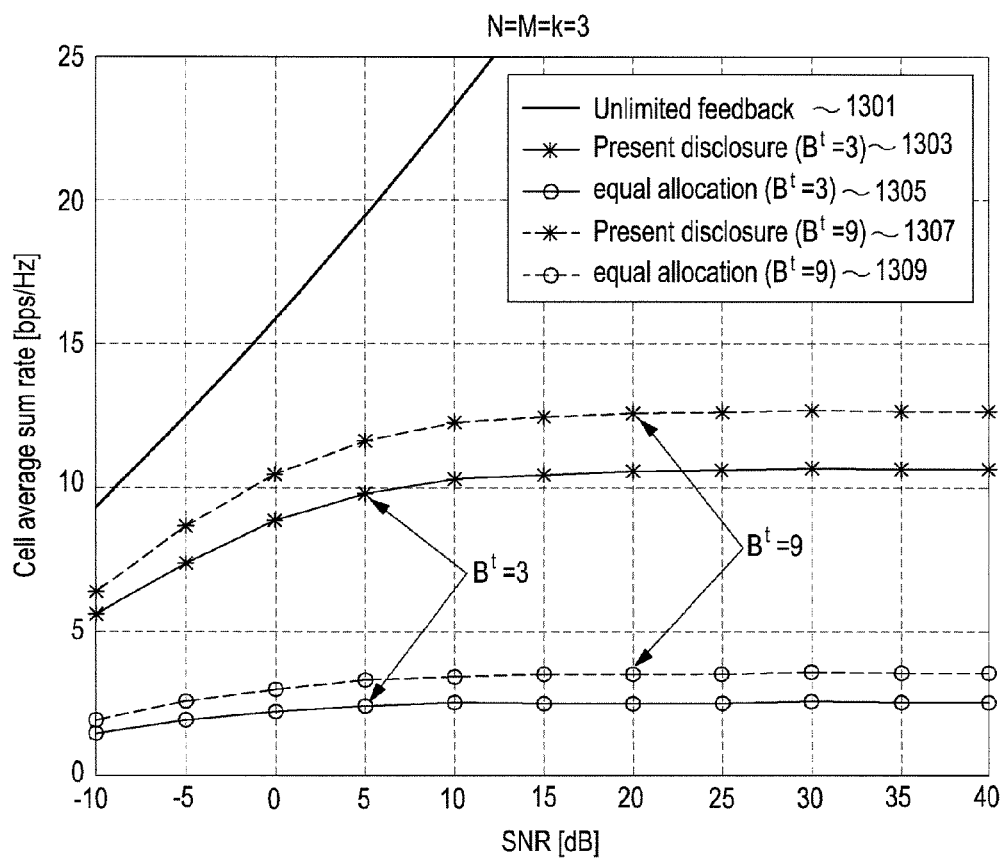
FIG. 13 is a graph illustrating results obtained by simulating performance of a feedback bit allocation method without consideration of pairing according to an embodiment of the present disclosure.

Hereinafter, performance achieved by the feedback bit allocation method according to the above-described embodiment of the present disclosure will be described. Simulations according to embodiments of the present disclosure are performed under the following conditions:

(1) Rayleigh fading
(2) Path loss exponent=3.75
(3) P: transmission power per base station
(4) Edge SNR=P
(5) UEs are uniformly distributed in each cell FIG. 13 is a graph illustrating results obtained by simulating performance of a feedback bit allocation method without the consideration of pairing according to an embodiment of the present disclosure. That is, an environment in which a UE communicates with all BSs is assumed, and pairing is not considered in the graph of FIG. 13.

For performance comparison, according to the embodiment of the present disclosure, FIG. 13 includes a performance result in an unlimited feedback environment and performance results in an equal allocation method in which a UE allocates equal bits (Bt/n) to all (N) BSs.

That is, from the performance difference between the unlimited feedback environment 1301, a case 1303 of $B^t=3$ and a case 1307 of $B^t=9$ in the embodiment of the present disclosure, and a case 1305 of $B^t=3$ and a case 1309 of $B^t=9$ in the equal allocation method, it can be seen that the feedback bit allocation method according to the embodiment of the present disclosure exhibits more excellent performance than the equal allocation method 1305 or 1309. In addition, it is identified that the performance is enhanced as the total number ($B^t$) of feedback bits increases.

Figure 14A:
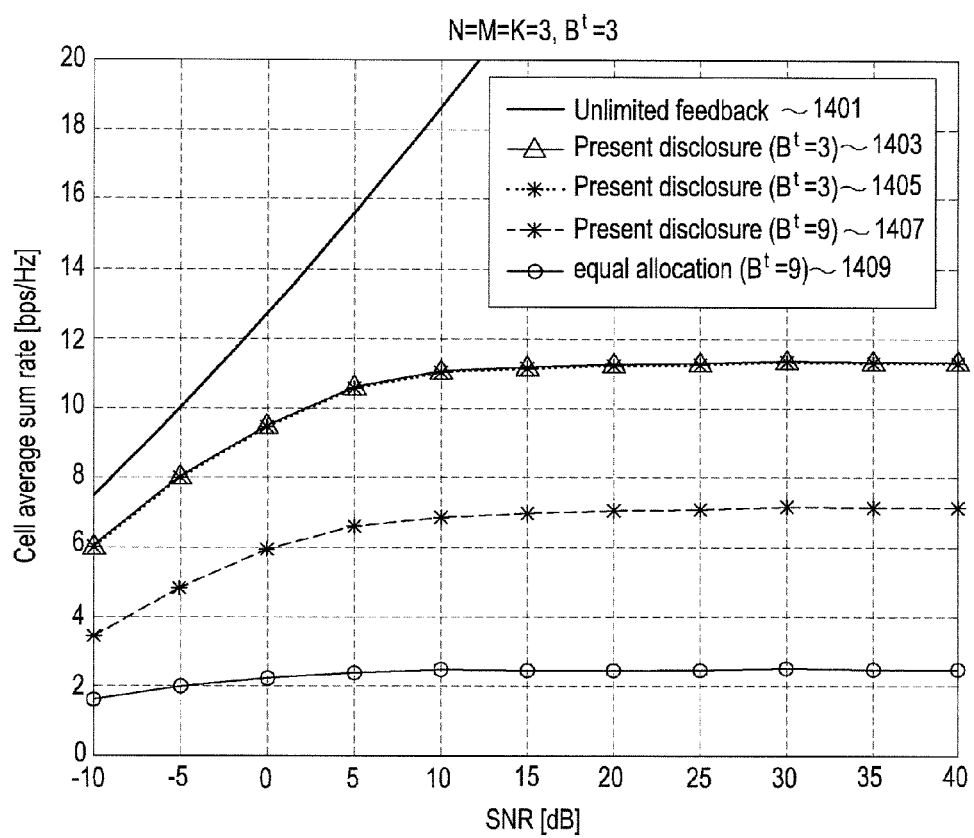
FIGS. 14A and 14B are graphs illustrating results obtained by simulating performance of a feedback bit allocation method in consideration of pairing according to an embodiment of the present disclosure.
Figure 14B:
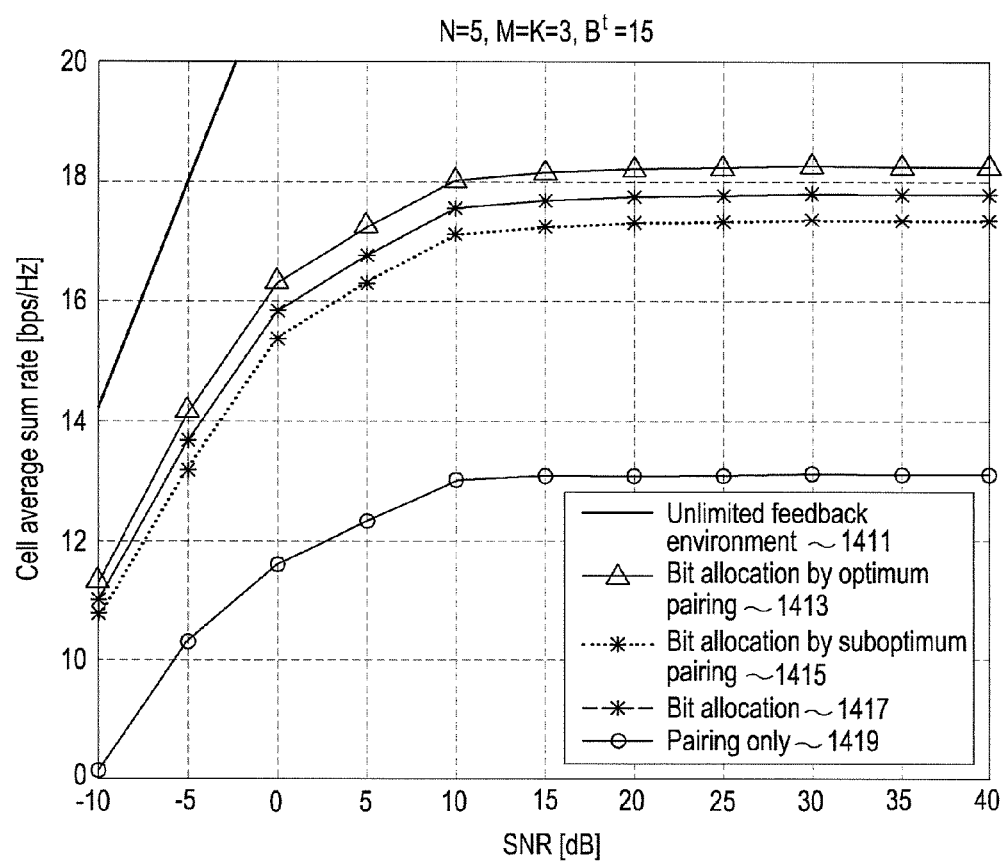

FIGS. 14A and 14B are graphs illustrating results obtained by simulating performance of a feedback bit allocation method in consideration of pairing according to an embodiment of the present disclosure.

That is, an environment in which, among all BSs, some BSs communicate with a UE is assumed, and a pairing problem is considered.

FIGS. 14A and 14B illustrate performance results for an unlimited feedback signal environment 1401, 1411, bit allocation by optimum pairing 1403, 1413, bit allocation by suboptimum pairing 1405, 1415, only bit allocation without pairing 1407, 1417, and only pairing 1409, 1419.

Comparing the case of bit allocation by optimum pairing 1403, 1413 and the case of only the bit allocation without pairing 1407, 1417, it can be identified that the performance difference is greater with decreasing total number of feedback bits. That is because a BS to which small bits of about 1 to 2 bits are allocated acquires inaccurate channel information from the corresponding feedback bits. Therefore, the entire system performance loss may be prevented by allocating no feedback bit to a BS located a relatively long distance away from the UE through pairing. In addition, it can be identified that the performance in the case of suboptimum pairing closely approaches that in the case of optimum pairing.

Hereinafter, results of a performance test for the above-described feedback bit allocation information transmission method will be described.

Figure 15:
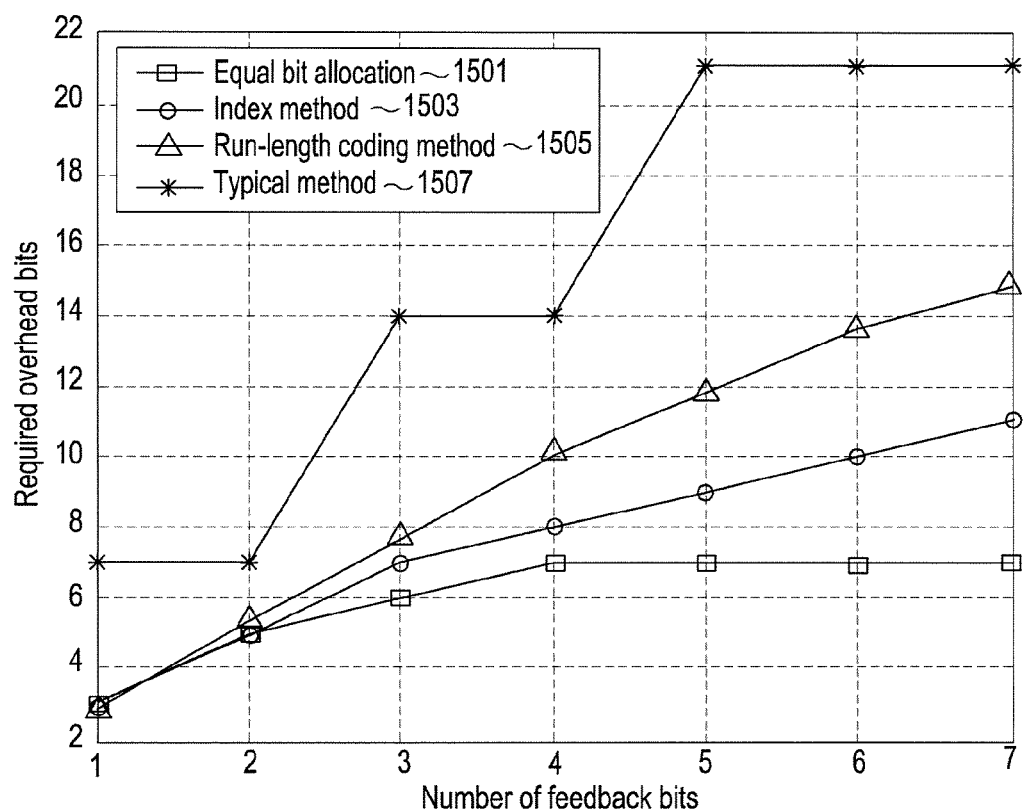
FIG. 15 is a graph illustrating results obtained by simulating performance of a feedback bit allocation information transmission method, according to an embodiment of the present disclosure, with increasing number of feedback bits.

FIG. 15 is a graph illustrating results obtained by simulating performance of a feedback bit allocation information transmission method, according to an embodiment of the present disclosure, with an increasing number of feedback bits.

The horizontal axis represents the size ($B^r$) of feedback bits, and the vertical axis represents the size of overhead bits required for transmission of feedback bit allocation information. In addition, it is assumed that N=7.

Reference numeral 1501 indicates an equal bit allocation method in which only pairing is performed and feedback bits are equally allocated to selected BSs, reference numeral 1503 indicates a matrix index method, and reference numeral 1505 indicates a run-length coding method. Meanwhile, reference numeral 1507 indicates the size of overhead bits in the typical method described with reference to FIG. 6.

It can be seen that the matrix index method 1503 and the run-length coding method 1505, proposed in the embodiment of the present disclosure, require a much smaller amount of overhead bits than the typical method 1507. In addition, it can be identified that the matrix index method 1503 exhibits performance good enough to require only the overhead bits of about 1 to 2 bits compared to the equal bit allocation method 1501.

Figure 16:
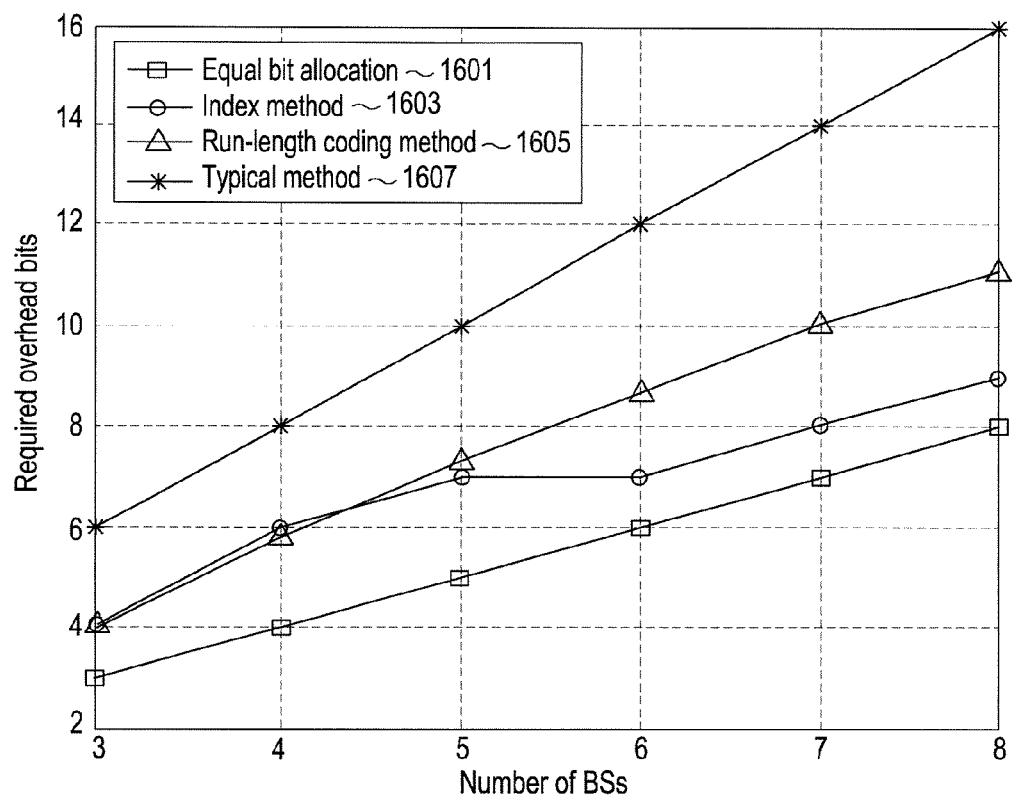
FIG. 16 is a graph illustrating results obtained by simulating performance of a feedback bit allocation information transmission method, according to an embodiment of the present disclosure, with increasing number of BSs.

FIG. 16 is a graph illustrating results obtained by simulating performance of a feedback bit allocation information transmission method, according to an embodiment of the present disclosure, with increasing number of BSs.

In FIG. 16, the horizontal axis represents the number of BSs, and the vertical axis represents the size of overhead bits required for transmission of feedback bit allocation information as in FIG. 15. In addition, it is assumed that $B^r=4$.

Reference numeral 1601 indicates an equal bit allocation method in which only pairing is performed and feedback bits are equally allocated to selected BSs, reference numeral 1603 indicates a matrix index method, and reference numeral 1605 indicates a run-length coding method. Meanwhile, reference numeral 1607 indicates the size of overhead bits in the typical method described with reference to FIG. 6.

Since analysis for the results of FIG. 16 is the same as that of FIG. 15, a description thereof will be omitted.

Hereinafter, performance results by a feedback bit allocation method, according to an embodiment of the present disclosure, when the size of a feedback signal is fixed will be described.

As listed in Table 1 below, simulations are performed with a system considering overhead bits corresponding to each bit allocation scheme and the size of feedback bits used in actual channel feedback when using an index-type feedback bit allocation information.

TABLE 1

| | Setting | | | |
|---|---|---|---|---|
| | A; Total 8 bits$^{(N=3)}$ | | A; Total 10 bits$^{(N=4)}$ | |
| Scheme | Overhead | Channel feedback | Overhead | Channel feedback |
| Equal bit allocation without pairing | X | 8 | X | 10 |
| Equal bit allocation with pairing | 3 | 5 | 4 | 6 |
| Bit allocation of present disclosure | 4 | 4 | 6 | 4 |

Figure 17:
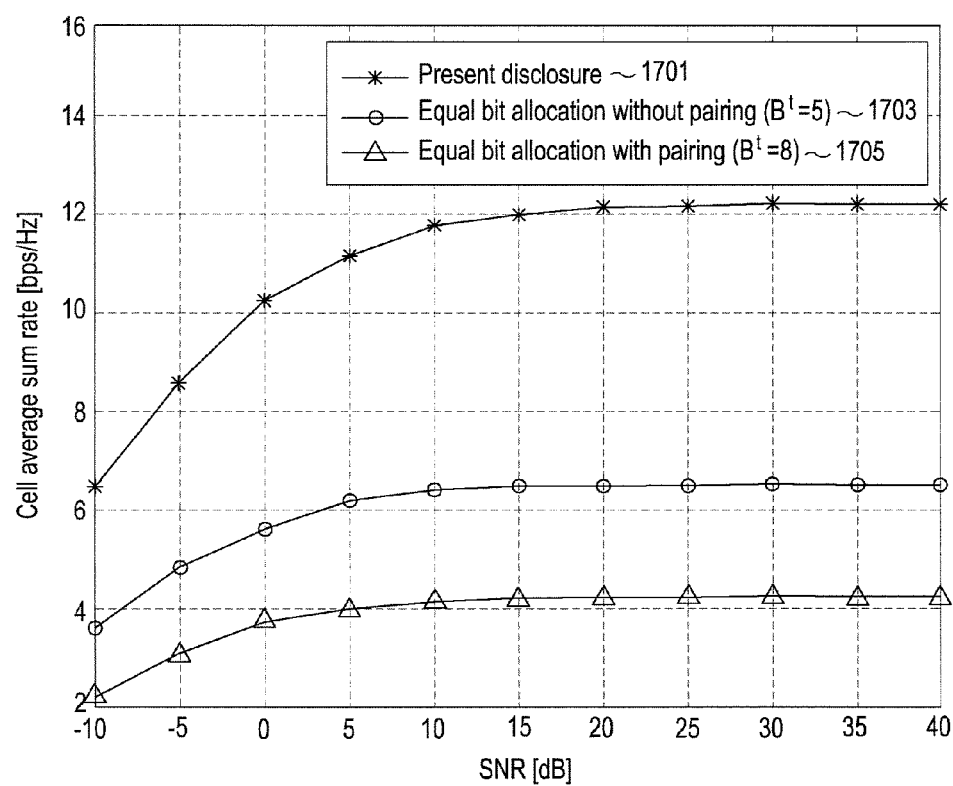
FIG. 17 is a graph illustrating performance results in system A of Table 1 according to an embodiment of the present disclosure.
Figure 18:
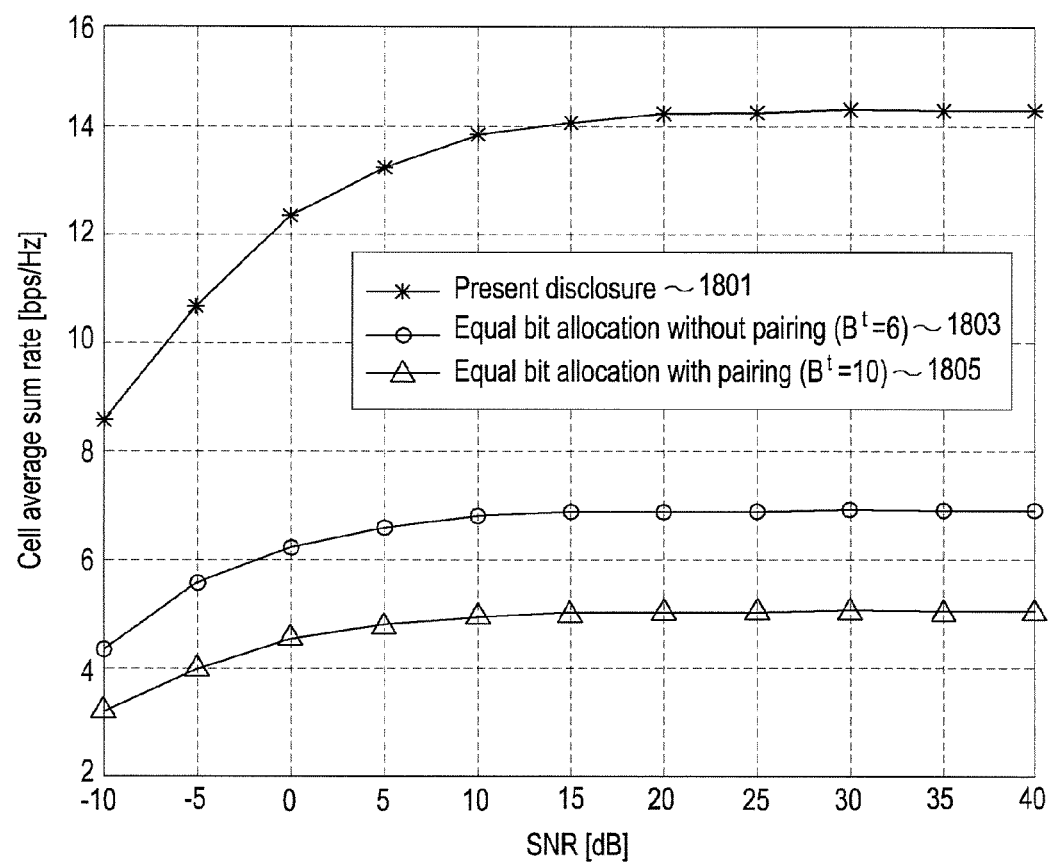
FIG. 18 is a graph illustrating performance results in system B of Table 1 according to an embodiment of the present disclosure.

FIG. 17 is a graph illustrating performance results in system A of Table 1 according to an embodiment of the present disclosure, and FIG. 18 is a graph illustrating performance results in system B of Table 1 according to an embodiment of the present disclosure. In addition, in FIG. 17, N=3, M=3, and K=3, and in FIG. 18, N=4, M=3, and K=3.

Reference numerals 1701, 1801 indicate feedback bit allocation information transmission performance by a pairing and feedback bit allocation method and a matrix index method according to embodiments of the present disclosure. Reference numerals 1703, 1803 indicate performance of an equal allocation method without pairing, and reference numerals 1705, 1805 indicate performance of an equal allocation method with pairing.

It can be seen that although additional overhead occurs for transmission of feedback bit allocation information, the methods 1701, 1801, according to the embodiments of the present disclosure exhibits better performance than the equal allocation methods 1703, 1705, 1803, 1805. Therefore, it is identified that the entire system performance is considerably enhanced by applying feedback bit allocation transmission by the feedback bit allocation method and the matrix index method, proposed in the embodiments of the present disclosure, to the system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of transmitting a feedback signal to at least one base station (BS) among multiple BSs, by a user equipment (UE), in a wireless communication system comprising the multiple BSs for multi-cell cooperative communication with the UE, the method comprising:
   adjusting, by the UE, a bit number of the feedback signal for transmission of the feedback signal indicating a channel state of the UE based on distances between the multiple BSs and the UE, wherein the bit number of the feedback signal increases in proportion to a proximity between the BS among the multiple BSs and the UE, the bit number of the feedback signal being determined for each of the multiple BSs;
   generating, by the UE, feedback bits allocation information indicating the adjusted bit number of the feedback signal, by performing a run-length coding on values of a feedback bits allocation matrix representing the adjusted bit number of the feedback signal for each of the multiple BSs;
   transmitting, by the UE, the generated feedback bits allocation information to the at least one BS among the multiple BSs; and
   transmitting the feedback signal to the at least one BS among the multiple BSs, according to the feedback bits allocation information indicating the adjusted bit number of the feedback signal.

2. The method of claim 1, wherein the adjusting of the bit number of the feedback signal comprises:
   selecting at least one BS for communicating with the UE from the multiple BSs; and
   allocating the bit number of the feedback signal for the at least one selected BS.

3. The method of claim 1, wherein the adjusting of the bit number of the feedback signal comprises:
   determining a solution for minimizing an upper limit of a rate gap,
   wherein the rate gap means a difference between a data transmission rate in an unlimited feedback signal UE system and a data transmission rate in a limited feedback signal UE system.

4. The method of claim 3, wherein the determining of the solution for minimizing the upper limit of the rate gap comprises:
   separating the upper limit into a BS pairing problem for BS selection and a problem of the feedback bits;
   determining a solution of the separated BS pairing problem to minimize the upper limit; and
   substituting the determined solution of the pairing problem into the upper limit and determining a solution of the feedback bits to minimize the upper limit.

5. The method of claim 4, where the separating comprises assuming that the solution of the BS pairing problem is determined.

6. The method of claim 4, wherein the determining of the solution of the separated BS pairing problem comprises:
   arranging the multiple BSs in order of distances between the multiple BSs and the UE;
   determining all subsets comprising BSs located the shortest distance from the UE among the multiple BSs arranged in order of the distances; and
   determining a subset minimizing the separated BS pairing problem among the subsets.

7. The method of claim 1, wherein the generating of the feedback bits allocation information comprises:
   generating a feedback bits allocation matrix representing the number of feedback bits allocated for the at least one BS.

8. The method of claim 7, wherein the transmitting of the feedback bits allocation information comprises:
   generating a matrix index corresponding to the feedback bits allocation matrix.

9. A method of receiving a feedback signal from a user equipment (UE), by a base station (BS), in a wireless communication system comprising multiple BSs for multi-cell cooperative communication with the UE, the method comprising:
   receiving, by the BS, an uplink signal from the UE;
   transmitting, by the BS, a received signal strength indicator of the uplink signal to the UE;

receiving, from the UE, feedback bits allocation information generated using the received signal strength indicator; and receiving, from the UE, the feedback signal according to a bit number of the feedback signal indicated by the received feedback bits allocation information, wherein the bit number of the feedback signal is determined by the UE based on distances between the multiple BSs and the UE, the bit number of the feedback signal for transmission of the feedback signal indicating a channel state of the UE, and wherein the bit number of the feedback signal increases in proportion to a proximity between the BS among the multiple BSs and the UE, wherein the feedback bits allocation information is obtained by performing a run-length coding on values of a feedback bits allocation matrix representing the bit number of the feedback signal allocated for each of the multiple BSs.

10. The method of claim 9, wherein the feedback bits allocation information comprises a matrix index corresponding to a feedback bits allocation matrix indicating the number of feedback bits allocated for the BS.

11. A user equipment (UE) for transmitting a feedback signal to at least one base station (BS) among multiple BSs in a wireless communication system comprising the multiple BSs for multi-cell cooperative communication with the UE, the UE comprising:

a transceiver configured to communicated with the at least one BS among the multiple BSs; and a controller configured to:
  adjust a bit number of the feedback signal for transmission of the feedback signal indicating a channel state of the UE based on distances between the multiple BSs or the UE, wherein the number of feedback bits increases in proportion to a proximity between a BS among the multiple BSs and the UE, the bit number of the feedback signal being determined for each of the multiple BSs,
  generate feedback bits allocation information indicating the adjusted bit number of the feedback signal, by performing a run-length coding on values of a feedback bits allocation matrix representing the adjusted bit number of the feedback signal for each of the multiple BSs,
  control the transceiver to transmit the generated feedback bits allocation information to the at least one BS among the multiple BSs, and
  control the transceiver to transmit the feedback signal to the at least one BS among the multiple BSs, according to the transmitted feedback bits allocation information indicating the adjusted bit number of the feedback signal.

12. The UE of claim 11, wherein the controller is configured to:
  select at least one BS for communicating with the UE from the multiple BSs, and
  allocate the number of feedback bits for the at least one selected BS.

13. The UE of claim 11, wherein the controller is configured to determine a solution for minimizing an upper limit of a rate gap, wherein the rate gap means a difference between a data transmission rate in an unlimited feedback signal UE system and a data transmission rate in a limited feedback signal UE system.

14. The UE of claim 13, wherein the controller is configured to separate the upper limit into a BS pairing problem for BS selection and a problem of the feedback bits, determine a solution of the separated BS pairing problem to minimize the upper limit, substitute the determined solution of the pairing problem into the upper limit, and determines a solution of the feedback bits to minimize the upper limit.

15. The UE of claim 14, wherein the controller is configured to assume that the solution of the BS pairing problem is determined.

16. The UE of claim 14, wherein the controller configured to arrange the multiple BSs in order of distances between the multiple BSs and the UE, determine all subsets comprising BSs located the shortest distance from the UE among the multiple BSs arranged in order of the distances, and determine a subset minimizing the separated BS pairing problem among the subsets.

17. The UE of claim 11, wherein the controller is configured to generate a feedback bits allocation matrix representing the number of feedback bits allocated for the at least one BS.

18. The UE of claim 17, wherein the controller is configured to generate a matrix index corresponding to the feedback bits allocation matrix.

19. A base station (BS) for receiving a feedback signal from a user equipment (UE) in a wireless communication system comprising multiple BSs for multi-cell cooperative communication with the UE, the BS comprising:

a transceiver configured to:
  receive an uplink signal from the UE,
  transmit a received signal strength indicator of the uplink signal to the UE, and
  receive, from the UE, feedback bits allocation information generated using the received signal strength indicator; and a controller configured to:
  control the transceiver to receive, from the UE, the feedback signal according to a bit number of the feedback signal indicated by the received feedback bits allocation information, wherein the bit number of the feedback signal is determined by the UE based on distances between the multiple BSs and the UE, the bit number of the feedback signal for transmission of the feedback signal indicating a channel state of the UE, and wherein the bit number of the feedback signal increases in proportion to a proximity between the BS among the multiple BSs and the UE, wherein the feedback bits allocation information is obtained by performing a run-length coding on values of a feedback bits allocation matrix representing the bit number of the feedback signal allocated for each of the multiple BSs.

20. The BS of claim 19, wherein the feedback bits allocation information comprises a matrix index corresponding to a feedback bits allocation matrix representing the number of feedback bits allocated for the BS.

* * * * *